United States Patent [19]

Schierling et al.

[11] Patent Number: 5,768,950

[45] Date of Patent: Jun. 23, 1998

[54] FLYWHEEL DEVICE HAVING A SEALING FOR A GREASE CHAMBER

[75] Inventors: Bernhard Schierling, Kürnach; Hilmar Göbel, Grafenrheinfeld; Rudolf Bäuerlein, Schweinfurt, all of Germany

[73] Assignee: Fichtel & Sachs AG, Schweinfurt, Germany

[21] Appl. No.: 674,192

[22] Filed: Jul. 1, 1996

[30] Foreign Application Priority Data

Jul. 1, 1995 [DE] Germany .................. 195 24 100.2

[51] Int. Cl.⁶ .................................................. F16F 15/10
[52] U.S. Cl. ........................ 74/573 F; 74/574; 74/572
[58] Field of Search .................. 74/572–573 F; 464/24, 68; 192/208, 212, 70.12, 70.17, 113.23, 113.24

[56] References Cited

U.S. PATENT DOCUMENTS

| | | | |
|---|---|---|---|
| 3,953,987 | 5/1976 | Strasburg et al. | 464/24 |
| 5,146,811 | 9/1992 | Jächel . | |
| 5,353,664 | 10/1994 | Yamamoto | 74/573 F |
| 5,511,446 | 4/1996 | Kajitani et al. | 74/573 F |
| 5,595,539 | 1/1997 | Yamamoto | 464/24 |
| 5,597,059 | 1/1997 | Gerbauer et al. | 192/70.12 |

FOREIGN PATENT DOCUMENTS

| | | |
|---|---|---|
| 9414314 | 1/1995 | Germany . |
| 2182415 | 5/1987 | United Kingdom . |
| 2296072 | 6/1996 | United Kingdom . |

Primary Examiner—Vinh T. Luong
Attorney, Agent, or Firm—Cohen, Pontani, Lieberman, Pavane

[57] ABSTRACT

A flywheel device having two flywheel masses which are deflectable relative to each other. Within one of the masses a grease chamber is provided along with packings against the emergence of viscous medium. One of the packings rests against a sealing seat which is developed on a structural part of one of the flywheel masses and another one of the packings is also provided on a structural part of the flywheel mass. Under axial initial stress the two packings are brought to rest against, in each case, one side of a bearing. At least one of the structural parts of the flywheel mass which has a sealing seat is adapted to receive both the bearing and the packing and has recesses in which the holder of the packing can be inserted for axially securing the packings with respect to the structural part on the one hand and with respect to the bearing on the other hand. The structural part which is preassembled in this way, after being brought with a predeterminable axial force against the other structural part which also has a sealing seat, can be firmly connected in axial direction to the other structural part.

11 Claims, 6 Drawing Sheets

FLYWHEEL DEVICE HAVING A SEALING FOR A GREASE CHAMBER

BACKGROUND OF THE INVENTION

1. Field of the Invention

The present invention relates to a flywheel device, and more particularly to a flywheel device for a coupling of a motor vehicle.

2. Description of the Prior Art

German reference GE-GM 94 14 314, for instance FIG. 9 thereof, discloses a flywheel device which has a first flywheel mass which can be driven in rotation around an axis of rotation and a second flywheel mass which can be deflected via at least one bearing by at least a limited angle of rotation with respect to the first flywheel mass. The two flywheel masses are connected together by a torsion damping device, at least one of the flywheel masses being provided with a grease chamber which at least partially receives the torsion dampening device and which is provided with packings to prevent the emergence of viscous medium. Each of the packing has an L-shaped cross section, one arm of each packing axially gripping around a radially outer bearing ring of the bearing and a second arm, which extends in radial direction coming firmly to rest laterally against the bearing ring and coming to a rest with wiping action against the radially inner bearing ring, preferably with axial initial stress. One of the two packings lies at the radially inner end of a holding plate which is active as a structural part of the output-side flywheel mass. The other packing rests axially against a ring which is bolted to the radially inner end of the holding plate. This ring also forms a structural part of the output-side flywheel mass and, in the same way as the holding plate, serves as a sealing seat for the packing associated with it.

The two structural parts—holding plate and ring—serve, as soon as they are bolted together in an assembly step, as an axial lock for the two packings relative to the bearing. For this assembly process, it is necessary to place the packing on both sides of the bearing, arrange both the holding plate and the ring axially, and bolt them together. Due to the opposite directions of insertion of the holding plate and ring, problems can result upon assembly, since, before the two structural parts of the output side flywheel mass are held fixed against each other by the bolting together of the two structural parts, a final positioning of the two packings with respect to the bearing is by no means assured. The assembly unit which has been prepared in this manner can then be pushed in an axial direction onto the flywheel device and be held in this inserted position by locks both in the radially outer region and the radially inner region.

SUMMARY OF THE INVENTION

Accordingly, it is an object of the present invention to provide a flywheel device that simplifies assembly of a bearing which comes to rest via a packing against sealing seats of structural parts of a flywheel mass without thereby impairing the action of the packing.

Pursuant to this object, and others which will become apparent hereafter, one aspect of the present invention resides in a flywheel device including a first flywheel mass rotationally driveable about an axis of rotation, and a second deflectable flywheel mass. The second flywheel mass has a first structural part that forms a seal seat, and a second structural part that forms an opposing seal seat. Torsion damping means drivingly connect the second flywheel mass with the first flywheel mass. A grease chamber is arranged in at least one of the flywheel masses and contains a viscous medium. The torsion damping means is arranged at least partially in the grease chamber. A first packing is supported on one of the seal seats of the second flywheel mass so as to prevent leakage of the viscous medium from the grease chamber, and a second packing is supported on the other of the seal seats of the second flywheel mass. Bearing means are provided for deflecting the second flywheel mass relative to the first flywheel mass by at least a limited angle of rotation. The bearing means and the first and second packings are arranged in the second flywheel mass so that the packings are initially axially stressed against a respective side of the bearing means. A first one of the structural parts of the second flywheel mass is formed with recesses into which holding means of the packings project so as to axially secure the packings relative to the first structural part and the bearing means.

By having one of several structural parts of a flywheel mass receive both the bearing and the packing and, further by axially securing the packing with recesses with respect to the structural part on the one hand and with respect to the bearing on the other hand, all bearing and sealing parts can be preassembled into a structural part. In connection with which—which does not represent a problem in the case of an individual structural part—both the packing and the bearing can be introduced one after the other preferably in a given direction of introduction into the structural part. In this connection, the packings are in each case pushed just so deep into the structural part that their holding means engage into the corresponding recesses in the structural part and thus receive their axial locking in movement with respect to the bearing and the other packing. Thus, for instance, a first packing can be engaged in the structural part in order then to introduce the bearing and following it the second packing, in which case, insofar as the latter has engaged with its holding means in the corresponding recess, not only is its sealing function fulfilled but also the function of an axial securing of both itself and of the bearing against loosening from the structural part. With the insertion of the last-mentioned packing, the process of preassembly is accordingly concluded, whereupon this preassembled structural part can easily be connected with the other structural part of the flywheel mass which also has a sealing seat. The sealing seat of the first-mentioned structural part in this connection preferably cooperates together with the first packing inserted and the sealing seat of the second structural part with the last packing inserted. As a function of the axial force acting between the two structural parts of the flywheel mass, a greater or lesser initial stressing can be transmitted to the packing and thus their sealing action can be controlled. As soon as the preassembled structural part has been firmly attached in the axial direction to the other structural part, the assembly process is completed as far as the arrangement of the packing relative to the bearing is concerned.

In another embodiment of the invention the first structural part of the flywheel mass has an end side directed toward the second structural part of the flywheel mass. The first structural part is configured so that the end side has a greater spacing with respect to its region of application against the second structural part than the second packing facing the second structural part with respect to the sealing seat of the second structural part, so that an axial slot of predeterminable width remains between the end side and the region of application of the second structural part when the second packing has already engaged the sealing seat of the second structural part with a predeterminable initial stress. Thus, the initial stress to be applied to the packing can be optimally adjusted, since, because of the axial slot remaining between the two structural parts, an axial force can be applied to the packing with reduction of the size of said slot, whereby the initial stressing is increased. Similarly, by increasing the size of the axial slot, the initial stress produced on the packing can be reduced.

In still another embodiment of the invention the holding means of the packings are radial projections on an outer surface of the packings. Due to these radial projections—in combination with the recesses in a structural part of the corresponding flywheel mass—an axial securing of the packing for the preassembly is possible. A particularly simple construction of these holding means is obtained when they are arranged apart at predeterminable angular distances relative to the axis of rotation since in this way, with the use of only a small amount of material, an axial securing pointwise can already be obtained. On the other hand, in a further embodiment the holding means perform an additional function, namely a sealing action in radial direction, and they are developed circumferentially in order not to create any passage for viscous medium. The endeavors with respect to sealing are supported by an additional embodiment in which at least one of the structural parts of the second flywheel mass has an axial projection which is continuous in a circumferential direction and directed towards the adjacent packing so that, by pressing of the axial protrusion into the associated side of the packing, a formlock is produced which affords particularly great security against the passage of viscous medium. A preferred material for the packing is an elastomeric material, in which connection, on the one hand, an excellent sealing action can be assured while, on the other hand, the pressing-in of the axial projection is readily possible.

It is known to develop antifriction bearings with at least one axially slit bearing ring for the insertion of rolling bodies since, because so many rolling bodies are used that they lie directly against each other as seen in circumferential direction, a bearing can be formed which, dispensing with a separator, is extremely narrow in the axial direction. A bearing which is very advantageous to this extent can, to be sure, have the disadvantage that if the split bearing ring is located axially on the outside viscous medium passes radially outward under the action of the centrifugal force upon operation of the flywheel device through the joint between the two bearing rings. For this reason, pursuant to another embodiment of the invention the two structural parts are connected together in liquid-tight manner as soon as such a bearing is used. Such a construction is preferably supported by providing, radially outside the bearing but radially within the pressure-tight place of connection of the two structural parts, receiving chambers for viscous medium into which such fluid can pass insofar as it has passed through the joint in the bearing ring. Of course, the amount of viscous medium introduced into the actual grease chamber in one of the flywheel masses should be such that the volume of these receiving chambers is taken into consideration.

In still another embodiment of the invention the liquid-tight connection between the structural parts is produced by a weld seam which is continuous in the circumferential direction. In yet another embodiment of the invention the liquid-tight connection is obtained by interposing a third packing between the structural parts of the second flywheel mass and then connecting the structural parts together with rivets.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIG. 1b is a view along the section line 1b—1b of FIG. 1a;

DETAILED DESCRIPTION OF THE PREFERRED EMBODIMENTS

Figure 1:
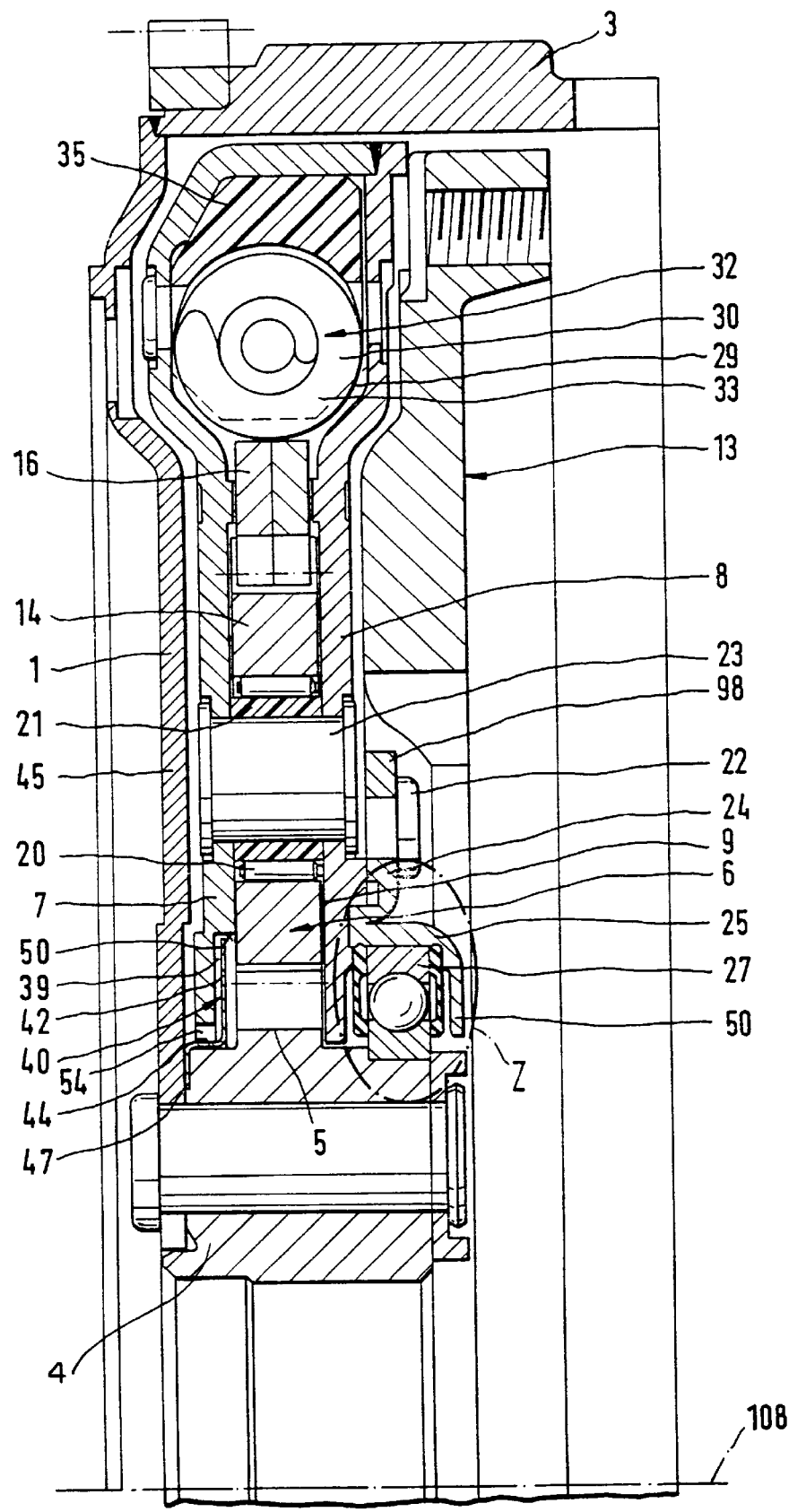
FIG. 1 shows a flywheel device having two flywheel masses which are turnable relative to each other, one of which is developed with a grease chamber with which a seal is associated.

FIG. 1 shows a flywheel device which, on its left-hand side, has a drive-side flywheel mass 1 with a primary plate 45 which extends substantially radially outward and which is provided in its circumferential region with an axial ring 3 for a starter pinion (not shown). The primary plate 45 is fastened on a hub 4 which can be arranged on a crankshaft (not shown) of an internal combustion engine and bears a sun wheel 5 of a planetary gearing 6 fixed for rotation. The planetary gearing has planet carriers 7, 8 arranged on both sides of the sun wheel 5, to act as walls of an outlet-side flywheel mass 13 and define a grease chamber 9 in the axial direction. Within the grease chamber 9, there are furthermore contained planet wheels 14 which, via their toothing, are in engagement with the sun wheel 5, and a hollow wheel 16 which in its turn is connected via its toothing to the planet wheels 14. The planet carriers 7, 8 are provided with a plurality of bearings 20 arranged on the same diameters, for instance needle bearings, on which in each case one of the planet wheels 14 is arranged. The planet carriers 7, 8 are held at a fixed distance apart in the axial direction by sleeves 21 and are held firmly by rivets 23 arranged in the sleeves 21 against the two ends of the corresponding sleeve 21. Further rivets 22 connect a disk-shaped structural part 24, fixed for rotation, with the planet carrier 8 facing away from the drive-side flywheel mass 1. An axial shoulder 25 is formed on the structural part 24, and extends axially in a direction away from the drive-side flywheel mass 1. The axial shoulder 25 has a radially inwardly extending projection 50. The structural part 24, as can be noted better in FIG. 1a, has, radially between the rivets 22 and the shoulder 25, a sealing element 52 which is arranged in a groove 53 in a radially outwardly extending flange 98 of the structural part 24. The sealing element 52 is held sealed against the planet carrier 8 by the rivets 22. Radially within the sealing element 52, the structural part engages via a circumferential development 55 extending in the direction towards the planet carrier 8 into a depression 56 in the planet carrier 8.

The disk-shaped structural part 24 serves to receive a bearing 27, for instance an antifriction bearing with a radially outer bearing ring 58, rolling bodies 59, and a radially inner bearing ring 60. The inner bearing ring 60 is arranged in a radial depression 62 in the hub 4 in such a manner that it comes axially to rest at one end against a radial rise in cross section 63 and, at the other end, is axially pushed by a pressure disk 64 toward the jump in cross section 63. The pressure disk 64 is held against the hub 4 by rivets 65.

Figure 2:
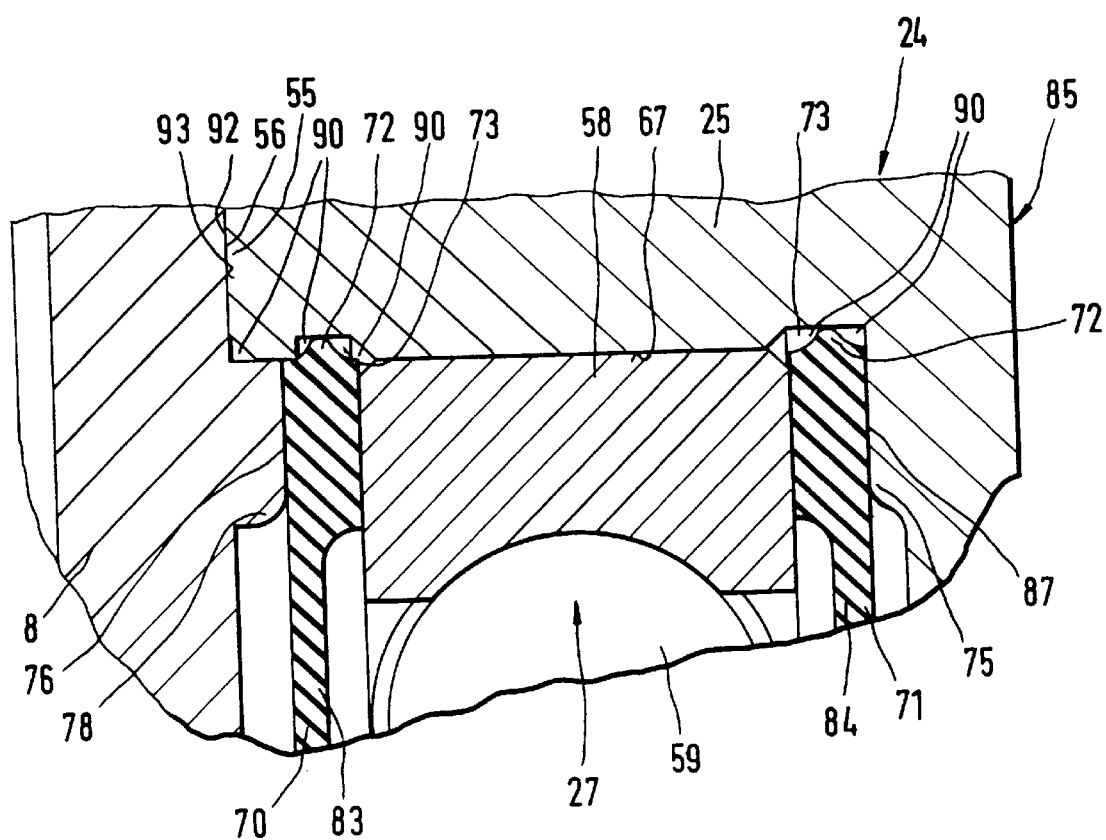
FIG. 2 shows a portion of the seal, again on a larger scale than in FIG. 1a, in which the structural part which receives the seal rests axially against the adjacent structural part.

The outer bearing ring 58 of the bearing 27 rests on its circumference against the radial inner wall 67 of the shoulder 25 of the disk-shaped structural part 24. Axially on both sides of the outer bearing ring 58 there are arranged packing 70, 71. The packing 70, 71 are developed in the circumferential region with holding means or elements 72 which protrude radially with respect to the circumference and engage in corresponding radial recesses 73 in the inner wall 67 of the shoulder 25 of the structural part 24. The packing 70, 71 are held in the axial direction in the following manner:

On the projection 50, in the radially outer region, there is provided a support 75 which protrudes axially in the direction toward the bearing 27 and acts as sealing seat 87 on which the corresponding side of the packing 71 can rest, this can best be seen in FIG. 2. The opposite side of the packing 71 rests against the associated end side of the outer bearing ring 58. This application is frictionally locked due to the axial introduction of force which will be explained in detail further below, so that a synchronous turning of structural part 24, packing 71, and outer ring 58 of the bearing 27 results. In the same way, the packing 70 which is arranged on the other side of the bearing 27, rests on its side facing the bearing ring 58, in friction lock against the bearing ring 58 and on its opposite side in friction lock against an annular extension 78 of the planet carrier 8, so that there is also a synchronous movement of this packing 70 with the planet carrier 8 on the one hand and the structural part 24 on the other hand as well as with the bearing ring 58 and the packing 71. The radial inner ends 80, 82 of the packing 70, 71 are held by elastic but prestressed and thus resilient arms 83, 84 against the corresponding side of the radially inner bearing ring 60 so that upon relative movements of the two bearing rings 58, 60 with respect to each other, they move on the inner bearing ring in a wiping fashion which permits a relative movement thereof.

The mounting of the arrangement described above is as follows:

Before the disk-shaped structural part 24 is fastened via the rivets 22 to the planet carrier 8, the packing 71 is inserted in the axial direction until it comes to rest on the sealing seat 87 and its holding means 72 have engaged in the corresponding recesses 73 in the structural part 24. The bearing 27 is then inserted in the axial direction until the radially outer bearing ring 58 has come against the corresponding side of the packing 71. By the further pushing of the second packing 70 inward in the axial direction into the structural part 24, the bearing ring 58 is secured in the axial direction against movements relative to the structural part 24 as soon as the holding means 72 of the second packing 70 have engaged in the corresponding recesses 73. A preassemblable structural part 85 for the bearing 27 is accordingly formed by the structural part 24 in cooperation with the packing 70, 71 and the bearing 27.

The structural part 85 which has been preassembled in this way is now brought in the axial direction against the corresponding side of the planet carrier 8 and is held in this position by the rivets 22. In this connection, the ring extension 78 serves as second sealing seat 76, which is active between the packing 70 and the planet carrier 8. Corresponding to the axial force by which the rivets 22 press the disk-shaped structural part 24 in the direction towards the planet carrier 8, an axial initial stress is transmitted via the sealing seat 76 to the packing 70 and from the packing 70 via the outer bearing ring 58, to the packing 71 which, in its turn, rests on the sealing seat 87. This axial initial stress, in its turn, affects, via the arms 83, 84, the axial force with which the inner ends 80, 82 of the packing 70, 71 are pressed against the corresponding side of the radially inner bearing ring 60.

The function of this device is such that the viscous medium contained in the grease chamber 9 which has travelled radially inward through an axial slot 99 between the sun wheel 5 and the planet carrier 8, whether as a result of gravity when the flywheel device is at rest or as a result of radially inward splattering, is protected against emergence from the flywheel device. This viscous medium is prevented from emerging by the packing 70 at two places, namely axially between the sealing seat 87 on the planet carrier 8 and the associated side of the packing 70 as well as axially between the inner end 82 on the arm 83 and the associated side of the inner bearing ring 60. Insofar as a very small amount of the viscous medium should pass through these sealing places, there is still the possibility of retaining this fluid axially between the outer bearing ring 58 and the packing 71 as well as axially between the packing 71 and the sealing seat 87 and radially further inwards axially between the inner end 82 of the packing 71 and the associated side of the inner bearing ring 60. Furthermore, the sealing element 52, prevents viscous medium which has traveled, at the packing 70, radially outward over the recesses 73, from emerging from the flywheel device.

One advantageous further development of this embodiment is the provision of collecting or receiving chambers 90 for viscous medium, within the circumferential region of the packing 70 or radially outside of it. For instance the collecting chambers 90 can be provided in the region between the axial development 55 on the structural part 24 and the depression 56 on the planet carrier 8, in particular in the region of the recesses 73 on the radial inner wall 67 of the shoulder 25 of the structural part 24. Upon the filling the grease chamber 9, the amount of viscous medium should, be increased by that portion which can penetrate into the collecting chambers 90 during operation.

Figure 1A:
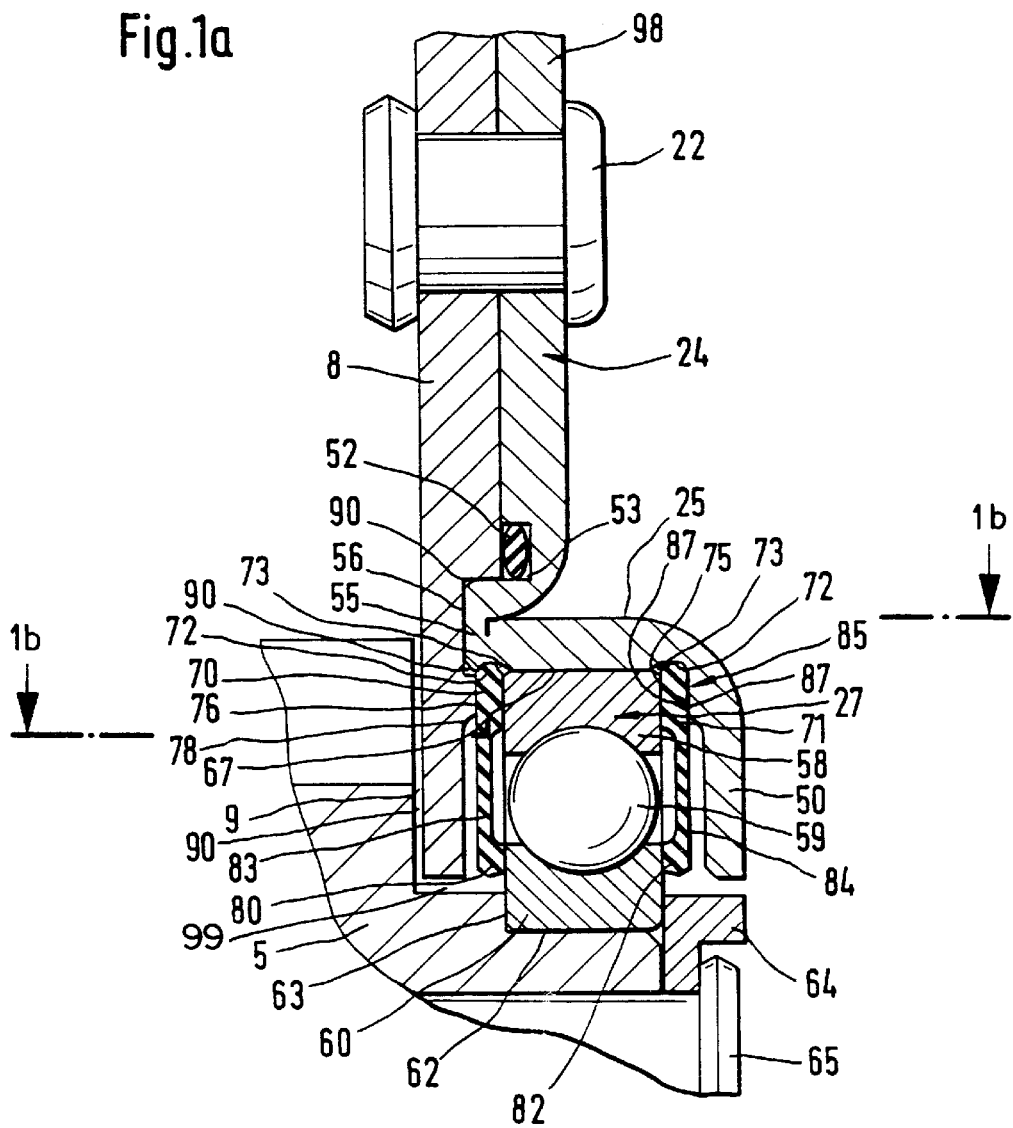
FIG. 1a shows a portion Z of the seal of FIG. 1 on a larger scale.
Figure 1B:
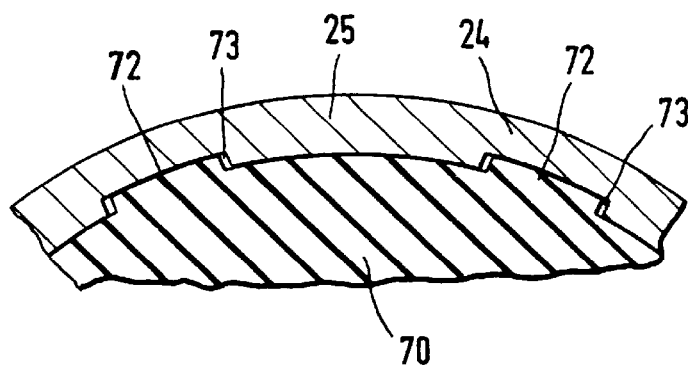

Returning to the holding means 72 on the packing 70, 71 by which the preassembling of the latter as well as of the bearing 27 in the structural part 24 is made possible, the following may be stated:

The holding means 72 can be developed in any desired number with any desired predeterminable angular spacings from each other relative to the axis of rotation 108 along the circumference of the corresponding packing 70, 71 (FIG. 1b). The recesses 73 are either developed with a length in the circumferential direction corresponding to a holding means 72 and in a number corresponding to the latter, or recesses 73 can be provided which are free of interruption in the circumferential direction. When using surrounding recesses 73, the holding means 72 should also be free of interruption in the circumferential direction so that an additional sealing is produced here which is active in the radial direction.

In FIG. 2, the disk-shaped structural part 24 with the bearing 27 and the packing 70, 71 is shown greatly enlarged.

Figure 3:
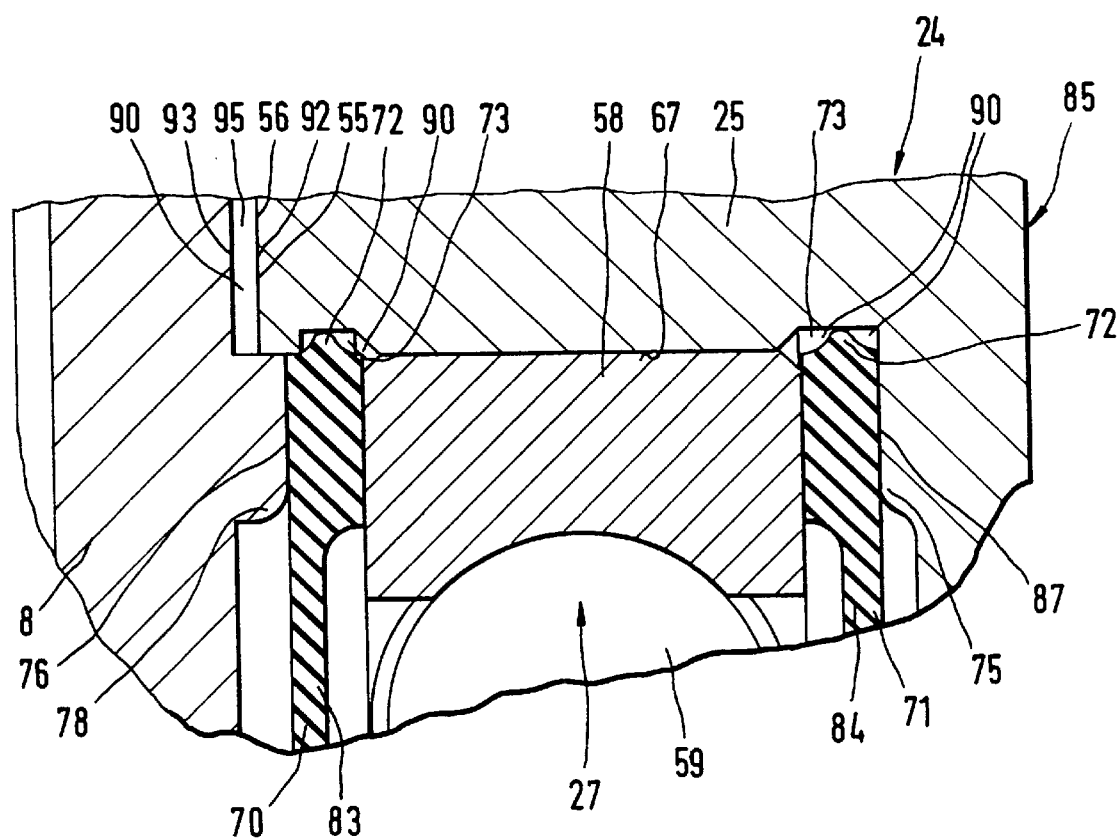
FIG. 3 is a view similar to FIG. 2, but with an axial slot between the two structural parts.

As can be noted already from FIG. 1a, in this embodiment the end 92 of the structural part 24 comes to rest at a resting region or region of application 93 of the planet carrier 8, so that, upon application of a very high pressing force between the end 92 and the resting region 93, deformation takes place the axial amount of which is controlling for the axial initial stressing of the packing 70, 71 produced from the axial introduction of force. The introduction of an axial force is more effective if, in accordance with FIG. 3, an axial slot 95 remains between the end 92 of the structural part 24 and the resting region 93 of the planet carrier 8. The slot permits, before the firm attachment between the structural part 24 and the planet carrier 8 by the rivets 22, a conversion of the stressing axial force into an initial tensioning of the packing 70, 71 without a deformation of the parts 8 and 24. As soon as the packing 70, 71 have been acted on by the advantageous initial stress, the application of the rivets 22 is effected, while maintaining the axial force introduced.

Figure 4:
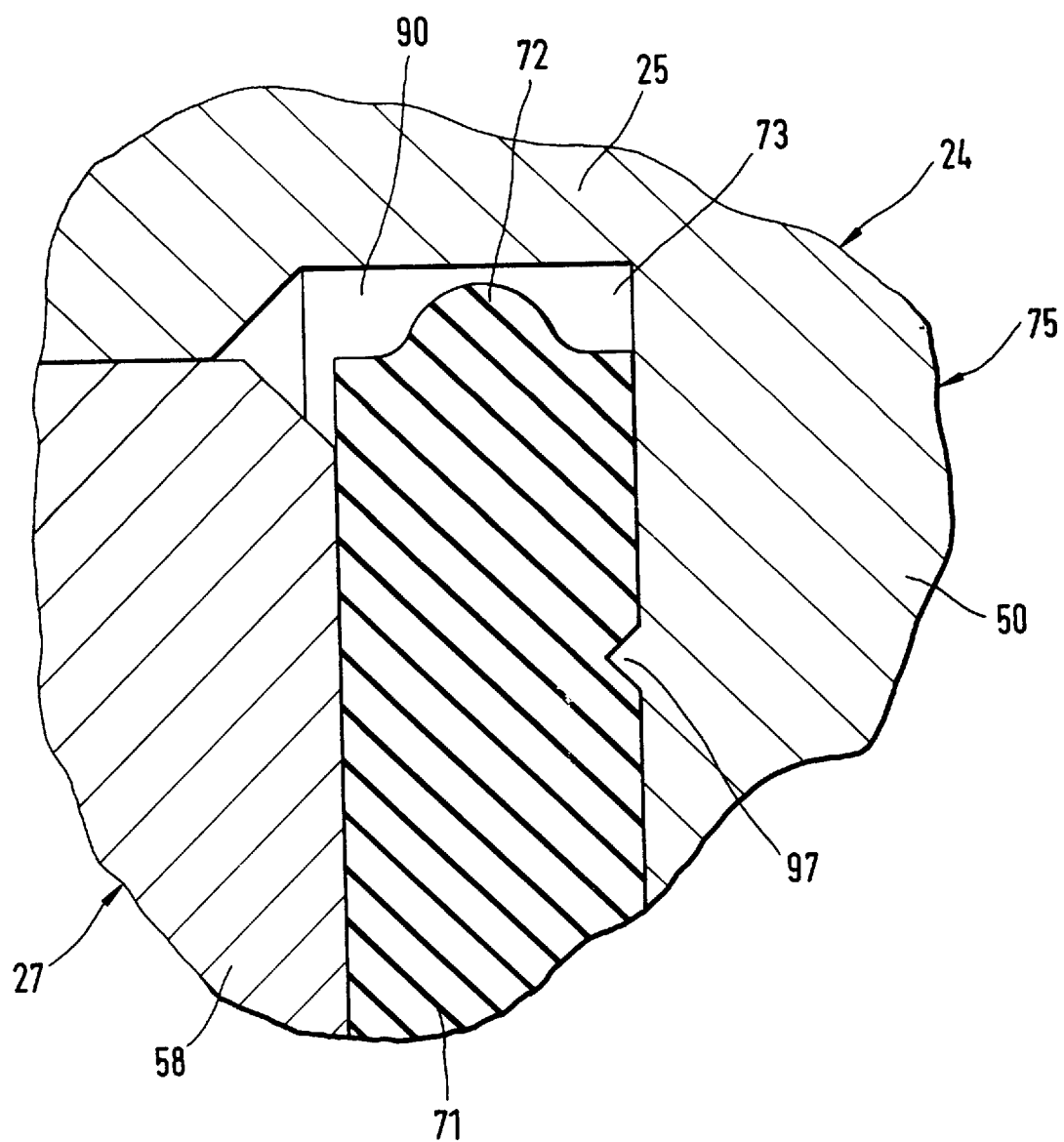
FIG. 4 shows a portion, on a larger scale, of a second embodiment of a packing having an axial projection on one of the structural parts.

FIG. 4 shows another improvement in the action of the packing 70, 71 in that optionally on one of the sealing seats 76, 87 of the planet carrier 8 or the disk-shaped structural part 24, or on one of the ends of the outer bearing ring 58, there is provided an axial projection 97. Upon the application of an axial force on the packing 70, 71, the projection 97 digs into the packing, particularly if the packing 70, 71 consists of elastomeric material. The excellent sealing properties described up to now are then further supported by a form-locked sealing. The axial projection 97 is developed without interruption in the circumferential direction.

Figure 5:
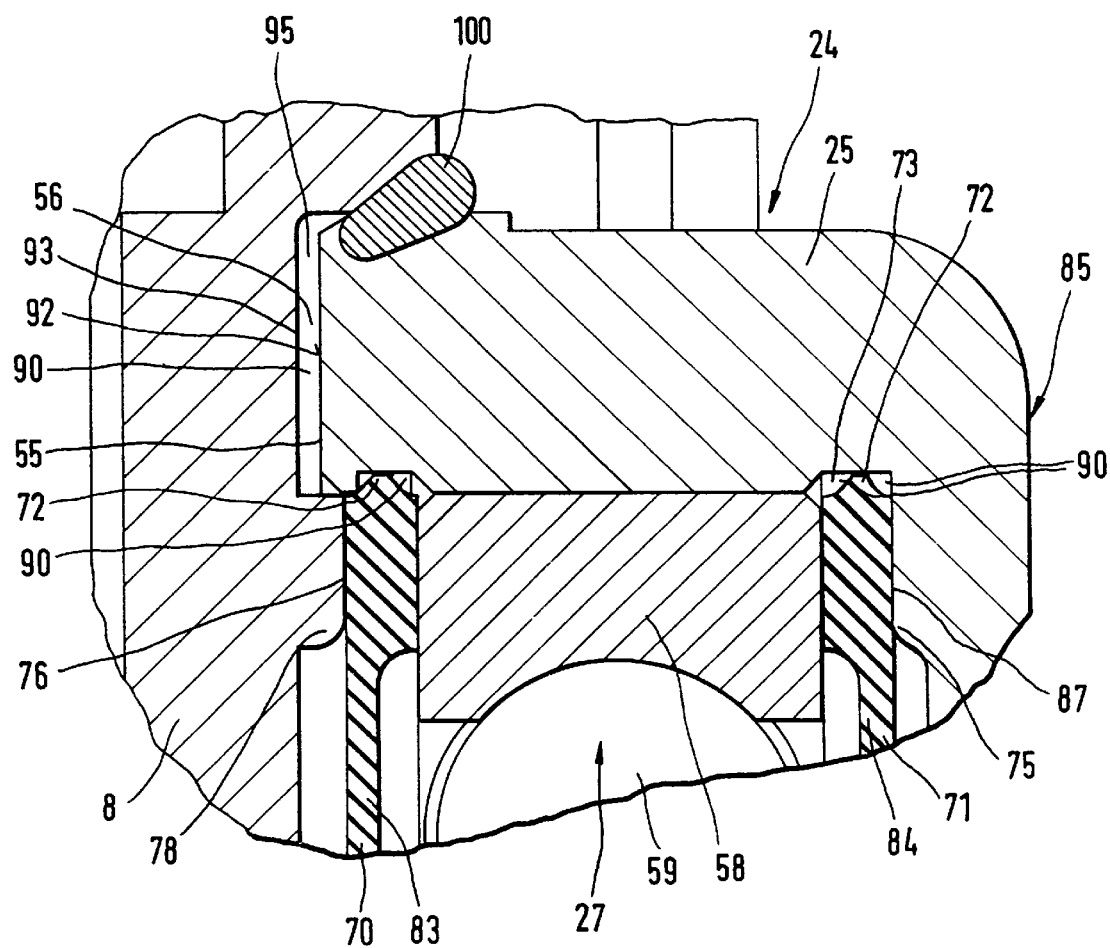
FIG. 5 shows a portion of the bearing section of FIG. 1, but of a third embodiment with a different connection and sealing of the structural parts.

FIG. 5 shows another embodiment for fastening the disk-shaped structural part 24 on the planet carrier 8. In this embodiment, the radially outward extending flange 98 of the structural part 24 described above, which serves to receive the sealing element 52 and the rivets 22, is dispensed with, but there remains the development 55 which engages into the recess 56 of the planet carrier 8. After application of an axial force for the adjustment of the initial stressing of the packing 70, 71, a connection is made in the connection region of the planet carrier 8 and structural part 24 by the production of weld seam 100 which, on the one hand, secures the disk-shaped structural part 24 in the predetermined axial position with respect to the planet carrier 8 and, on the other hand, insofar as developed circumferentially without interruption, acts as a packing for viscous medium between these two structural parts of the output side flywheel mass 13 which has penetrated into one of the collection chambers 90.

Returning to FIG. 1, the construction and function of the other structural parts of the flywheel device will now be briefly discussed. The hollow wheel 16 which has already been mentioned has, radially outside its tooth engagement region with the planet wheels 14, recesses 29 which are spaced apart at predetermined angular distances. In each of the recesses 29 there is inserted a spring device 30 of a torsion vibration damper 32 which has a plurality of springs 33 which are connected together in a manner known from German reference 41 28 868 A1 by slide shoes 35. The spring device 30 rests at one end on the hollow wheel 16 and at the other end on the planet carriers 7, 8, in each case via control means, not shown. The spring device 30 is located in the axial direction between the two planet carriers 7, 8 which are firmly connected together in the radially outer region by welding and effect a securing of the gearwheels 14, 16 in the axial direction.

As already mentioned, the planet carriers 7, 8 delimit, as walls, the grease chamber 9 which is at least partially filled with viscous medium. Emergence of the viscous medium from the grease chamber on the side of the planet carrier 7 is prevented in the following manner:

On the left-hand side in FIG. 1, the planet carrier 7 has, in the radially inner region, an annular depression 39 which, seen from the grease chamber 9, is set back with respect to the radially further outward extending side of the wall facing the gear wheels 14 and 16. The depression 39 serves to receive a packing 40 which has a flange part 42 extending substantially radially outward, a bearing part 44 annularly surrounding the hub 4, and a radially inwardly directed clamping part 47 which engages between the primary plate 45 and the hub 4. The packing 40 is formed by a thin sheet-metal part which is spaced by a gap width from both a radial circumferential edge 50 of the depression and from the limiting wall, facing the flange part 42, of the depression 39. The side of the packing 40 which faces the gear wheels 5 and 14 on the other hand is at a considerably greater distance from the gear wheels 5 and 14 than the size of said slots.

The planet carrier 7 ends in the radially inner region at a distance from the hub 4 so that the remaining annular opening 54 permits the passage of the bearing part 44 of the packing 40. Between the primary plate 45 of the drive-side flywheel mass 1 and its hub 4, the packing 40 is preferably held, fixed for rotation, via its clamping part 47.

The manner of operation of the flywheel device is as follows:

Upon the introduction into the flywheel mass 1 of a torque on which torsional vibrations are superimposed when an internal combustion engine is used as drive, the movement produced thereby is conducted to the sun wheel 5 which, due to its meshing with the planet wheels 14, drives the latter. While the moment of rotation is conducted via the planet wheels 14 to the planet carriers 7, 8 and thus to the output side flywheel mass 13 without any change in the direction of rotation, the torsional vibration damper 32 sees to a reduction in the amount of the torsional vibration introduced with the moment of rotation. In this connection, since the planet carriers 7, 8 at first still act fixed for rotation as a result of their inertia, the movement of the sun wheel 5 is converted into a rotation of the planet wheels 14 around the corresponding bearings 20 and into a movement of the bearings 20 themselves as well as of the hollow wheel 16 around the axis of rotation 108 of the flywheel device. In this way, the moment associated with the torsional vibration is branched, namely into a first partial moment which passes via the planet wheels 14 to the planet carriers 7, 8 and into a second partial moment which is transmitted to the hollow wheel 16. If the moment associated with the torsional vibration introduced on the center wheel is oriented in clockwise direction for instance as shown in FIG. 1, then a first partial moment acting in counterclockwise direction brings about, via the rotation of the planet wheels 14, a deflection of the hollow wheel 16 from its position of rest, while the planet carriers 7, 8 are driven by a second partial moment which acts in the clockwise direction. As a result, there is a relative movement between the planet carriers 7, 8 and the hollow wheel 16, in which connection the spring device 30 which rests on the control means (not shown) of the hollow wheel 16 and the planet carriers 7, 8 and, as a result thereof, the slide shoe 35, are moved along their guide path. The size of the deformation path of the spring device 30 is, of course, dependent on the translation ratio of the planetary gearing 6 and thus on the ratio of the number of teeth of the sun wheel 5 and the hollow wheel 16. As a result of this translation ratio, the partial moments which counteract each other on the hollow wheel 16 and the planet carriers 7, 8 can be greater than the drive-side moment but, upon superimposing with each other, there results an output-side moment which corresponds to the drive-side moment. The output-side moment is, to be sure, reduced by variations in synchronism in contradistinction to the drive-side moment as a result of the above-described function of the flywheel device.

The invention is not limited by the embodiments described above which are presented as examples only but can be modified in various ways within the scope of protection defined by the appended patent claims.

We claim:

1. A flywheel device, comprising: a first flywheel mass rotationally driveable about an axis of rotation; a second, deflectable flywheel mass having a first structural part that forms a seal seat, and a second structural part that forms an opposing seal seat; torsion damping means for drivingly connecting the second flywheel mass with the first flywheel mass; a grease chamber formed by at least one of the flywheel masses, the torsion damping means being at least partially arranged in the grease chamber; and a preassembly including the first structural part, a first packing supported on one of the seal seats of the second flywheel mass so as to seal the grease chamber, a second packing supported on another of the seal seats of the second flywheel mass and, a bearing configured to permit the second flywheel mass to deflect relative to the first flywheel mass, the bearing and the first and second packings being arranged in the first structural part of the second flywheel mass so that the packings are initially axially stressed against a respective side of the bearing, the first structural part of the second flywheel mass being formed with recesses, the packings including holding means that project into the recesses so as to axially secure the packings relative to the first structural part and the bearing, the preassembly being axially connected to the second structural part so that the second packing rests against the seal seat of the second structural part with a predetermined axial force.

2. A flywheel device according to claim 1, wherein the first structural part of the flywheel mass has an end side directed toward the second structural part of the flywheel mass, the first structural part being configured so that the end side has a greater spacing from a region of application of the second structural part than the second packing facing the second structural part has from the sealing seat of the second structural part, so that an axial slot of predeterminable width remains between the end side and the region of application of the second structural part.

3. A flywheel device according to claim 1, wherein the first structural part has a radial inner wall in which the recesses are formed, the holding means of the packings being radial projections arranged on an outer circumference of the packing so as to extend into the recess in the radial inner wall of the first structural part.

4. A flywheel device according to claim 1, wherein the holding means are arranged apart at predetermined angular distances relative to the axis of rotation.

5. A flywheel device according to claim 1, wherein the holding means are formed circumferentially along a circumference of the packings.

6. A flywheel device according to one claim 1, wherein at least one of the structural parts of the second flywheel mass has an axial projection which is continuous in a circumferential direction and is directed towards an adjacent one of the first and second packings so that the projection can be pressed into the packing upon application of the predetermined axial force.

7. A flywheel device according to claim 1, wherein the packings are made of elastomeric material.

8. A flywheel device according to claim 1, wherein the bearing includes at least one axially split bearing ring, and further comprising means for producing a liquid-tight connection between the first structural part and the second structural part.

9. A flywheel device according to claim 8, wherein the structural parts and the bearing are configured to define viscous medium receiving chambers radially outside thereof.

10. A flywheel device according to claim 8, wherein the liquid-tight connection means between the structural parts includes a circumferentially continuous weld seam between the structural parts.

11. A flywheel device according to claim 8, wherein the liquid-tight connection means includes a third packing arranged between the structural parts and rivet means for fastening the structural parts together with the third packing therebetween.

* * * * *